(12) United States Patent
Ehrenpreis

(10) Patent No.: US 11,229,578 B2
(45) Date of Patent: Jan. 25, 2022

(54) METHOD AND DEVICE FOR THE ENHANCEMENT OF TOPICAL TREATMENTS FOR ORAL MUCOSITIS AND OTHER ORAL CONDITIONS

(71) Applicant: E2BIO LIFE SCIENCES, LLC, Skokie, IL (US)

(72) Inventor: Eli D. Ehrenpreis, Skokie, IL (US)

(73) Assignee: E2BIO LIFE SCIENCES, LLC, Skokie, IL (US)

(*) Notice: Subject to any disclaimer, the term of this patent is extended or adjusted under 35 U.S.C. 154(b) by 11 days.

(21) Appl. No.: 16/242,131

(22) Filed: Jan. 8, 2019

(65) Prior Publication Data
US 2019/0209436 A1 Jul. 11, 2019

Related U.S. Application Data

(60) Provisional application No. 62/615,107, filed on Jan. 9, 2018.

(51) Int. Cl.
*A61J 17/00* (2006.01)
*A61C 19/06* (2006.01)
*A61J 7/00* (2006.01)

(52) U.S. Cl.
CPC ........... *A61J 7/0053* (2013.01); *A61C 19/063* (2013.01)

(58) Field of Classification Search
CPC ... A61C 19/063; A61C 19/066; A61C 19/006; A61C 19/06; A61C 19/00; A61C 7/08; A61J 7/0053
See application file for complete search history.

(56) References Cited

U.S. PATENT DOCUMENTS

| | | | |
|---|---|---|---|
| 8,497,243 B2 | 7/2013 | Hesson et al. | |
| D815,740 S | 4/2018 | Strand et al. | |
| 2003/0185884 A1 | 10/2003 | Singh et al. | |
| 2005/0136381 A1* | 6/2005 | Andersen | A61C 19/063 433/215 |
| 2007/0104808 A1 | 5/2007 | Rosenbloom | |

(Continued)

FOREIGN PATENT DOCUMENTS

| | | |
|---|---|---|
| WO | 2017041036 A1 | 3/2017 |
| WO | 2017085262 A1 | 5/2017 |

OTHER PUBLICATIONS

International Search Report/Written Opinion dated Apr. 25, 2019, in connection with PCT/US19/12600.

(Continued)

*Primary Examiner* — Lauren P Farrar
*Assistant Examiner* — Hamza A Darb
(74) *Attorney, Agent, or Firm* — Adam K. Sacharoff

(57) ABSTRACT

A method and device for the prevention and treatment of oral mucositis using a combination of an anti-mucositis agent and the device that is held in place for prolonged periods of time within the mouth. Portions of the device overlie and are brought into direct contact with the portions of the oral mucosa that are affected by oral mucositis. The method provides prolonged contact time of the anti-mucositis agents to the areas of the mucosa that are affected by oral mucositis. The combination may be used to treat oral mucositis or, prophylactically, to prevent oral mucositis that may occur in patients that receive chemotherapy and/or radiation therapy.

20 Claims, 8 Drawing Sheets

FIG. 1

(56) References Cited

U.S. PATENT DOCUMENTS

| | | | |
|---|---|---|---|
| 2007/0264289 A1* | 11/2007 | Oien | A61K 9/0014 |
| | | | 424/400 |
| 2008/0044797 A1* | 2/2008 | Bardach | A61C 19/063 |
| | | | 433/217.1 |
| 2009/0017422 A1* | 1/2009 | Creamer | A61C 19/06 |
| | | | 433/215 |
| 2009/0074679 A1* | 3/2009 | Silverman | A61C 5/00 |
| | | | 424/53 |
| 2016/0331707 A1 | 11/2016 | Zielinski et al. | |
| 2017/0231815 A1 | 8/2017 | Berg et al. | |
| 2017/0304107 A1* | 10/2017 | Choi | A61C 7/08 |

OTHER PUBLICATIONS

International Preliminary Report on Patentability, dated Aug. 30, 2019; PCT/US2019/012600—related application.
Walladbegi, et al., Innovative intraoral cooling device better tolerated and equally effective as ice cooling; Cancer Chemother Pharmacol (2017) Published online Oct. 3, 2017; pp. 80; 965-972.

* cited by examiner

METHOD AND DEVICE FOR THE ENHANCEMENT OF TOPICAL TREATMENTS FOR ORAL MUCOSITIS AND OTHER ORAL CONDITIONS

RELATED APPLICATION

This application claims priority from U.S. provisional application entitled "Method For the Enhancement of Topical Treatments for Oral Mucositis and Other Oral Conditions," Ser. No. 62/615,107, filed Jan. 9, 2018.

BACKGROUND OF THE INVENTION

Oral mucositis is an inflammation of the mucosa of the mouth that ranges from redness to severe ulceration. Also called stomatitis, mucositis is a common, debilitating complication that may be induced by, for example, chemotherapy, radiotherapy and bone marrow transplantation. Oral mucositis is found in almost 100% of patients receiving radiotherapy for head and neck tumors, in about 95% of patients undergoing bone marrow transplantation and in about 40% of patients receiving chemotherapy as it results from the effect of radiation on the oral mucosa and from the systemic effects of cytotoxic chemotherapy agents. In addition, about 90% of children with leukemia have this condition.

Patients with oral mucositis develop erythema (redness) and ulcerations of the lining of the mouth (mucosa) that result in a variety of symptoms. Other associated symptoms include diminished taste sensation (hypogeusia), noxious taste alterations (dysgeusia), complete loss of taste sensation (ageusia) and dry mouth (xerostomia).

Oral mucositis decreases quality of life, compromises nutritional status, causes weight loss and micronutrient deficiencies, and increases the risk of infections and other complications of treatment. More problematic, perhaps, oral mucositis may reduce a patient's ability to tolerate or maintain their chemotherapeutic or radiation therapy regimens. When oral mucositis develops from treatment with a specific chemotherapeutic agent, it may prevent further use of this medication, even if the treatment has the potential to save the patient's life. After completion of therapy, some patients have ongoing symptoms of oral mucositis, especially after receiving radiation therapy for cancers of the head and neck. In these patients, long-term nutritional compromise and diminished quality of life further aggravate the effects of having cancer.

The present state of treating or preventing mucositis generally involves the application of substances directly to the affected areas, as well as systemic administration. There are, however, very few effective treatments for oral mucositis. Accordingly, a need remains for better and more effective treatments for mucositis and for inhibiting or delaying the onset of mucositis.

SUMMARY OF THE INVENTION

In one aspect of the present disclosure, a device for treating an affected area of the mucosal tissue of a person comprises: a fitting portion having an arcuate shape corresponding to the dental arche of the person; at least one covering portion defined on the fitting portion, the covering portion having a respective outer surface, an upper wing portion and a lower wing portion; at least one bite flange extending from an interior surface of the fitting portion; and an upper ledge extending from the interior surface of the fitting portion and following the arc of the fitting portion, wherein an upper surface of the upper ledge and an upper surface of the at least one bite flange are continuous with one another, and wherein the at least one covering section is more flexible than the fitting portion.

A portion of the outer surface of the covering portion may comprise a micro-textured surface having a plurality of reservoirs.

A therapeutic agent may be disposed on the outer surface of the covering portion or in the reservoirs.

In some embodiments, the therapeutic agent may be an anti-mucositis agent that comprises at least one of: a pharmaceutical; a cytoprotective agent; a mucoadhesive substance; a local anesthetic agent; or an antioxidant agent.

The at least one bite flange may further comprise a lower surface, and may be configured such that, when the device is placed in the mouth of a person, the bite flange lower surface contacts the lower teeth and the bite flange upper surface contacts the upper teeth.

Each of the upper wing portion and the lower wing portion may be thinner than the body portion and the upper wing portion may be configured to extend above a gum line of the person to cover or contact a portion of the upper inner cheek, and the lower wing portion may be configured to extend below a gum line of the person to cover or contact a portion of the lower inner cheek.

The upper and lower wing portions may be configured to cover the openings for the parotid duct and at least one salivary gland.

Another aspect of the present disclosure is a method of delivering a therapeutic agent to the mucosal tissue of a person or an affected portion thereof, which comprises: administering a therapeutically effective amount of the therapeutic agent to at least a portion of the mucosal tissue; inserting, in the mouth of the person, a device comprising: an oral retention portion that is suitably shaped to be retained in the oral cavity for a predetermined treatment period and a covering portion that has at least one surface that contacts the mucosal tissue being treated with the therapeutic agent.

Administering the therapeutically effective amount of the anti-mucositis agent may be conducted prior to chemotherapy or radiation treatment received by the person wherein the therapeutically effective amount of the anti-mucositis agent inhibits or delays the onset of mucositis.

Administering the therapeutically effective amount of the agent may comprise administering a therapeutically effective amount of an anti-mucositis agent, where the amount is provided to either treat or reduce the severity of mucositis; or to inhibit or delay the onset of mucositis.

The method may comprise: applying the agent to the portion of the mucosal tissue prior to inserting the device in the mouth of the person, applying the agent to the outer surface of the device prior to inserting the device in the mouth of the person, or, prior to inserting the device in the mouth of the person: applying a first amount of the agent to the portion of the mucosal tissue; and applying a second amount of the agent to the outer surface of the device.

The method may use a dental device that comprises: a fitting portion having an arcuate shape corresponding to the dental arche of the person and at least one covering portion, the covering portion having a respective outer surface, an upper wing portion and a lower wing portion; at least one bite flange extending from an interior surface of the fitting portion; an upper ledge extending from the interior surface of the fitting portion and following the arc of the fitting portion, wherein an upper surface of the upper ledge and an upper surface of the at least one bite flange are continuous with one another, wherein the at least one covering section is more flexible than the fitting portion, and wherein a portion of the respective outer surface of the at least one covering portion is in contact with the portion of the mucosal tissue.

A kit for delivering a therapeutic agent to the mucosal tissue of a person comprises: a therapeutically effective amount of the therapeutic agent; a device, comprising: a fitting portion having an arcuate shape corresponding to the dental arche of the person; at least one covering portion defined on the fitting portion, the covering portion having a respective outer surface, an upper wing portion and a lower wing portion; at least one bite flange extending from an interior surface of the fitting portion; and an upper ledge extending from the interior surface of the fitting portion and following the arc of the fitting portion, wherein an upper surface of the upper ledge and an upper surface of the at least one bite flange are continuous with one another, and wherein the at least one covering section is more flexible than the fitting portion; and printed instructions on how to use the device to administer the therapeutic agent to the mucosal tissue of the person.

BRIEF DESCRIPTION OF THE FIGURES

This application claims priority from U.S. provisional application entitled "Method For the Enhancement of Topical Treatments for Oral Mucositis and Other Oral Conditions," Ser. No. 62/615,107, filed Jan. 9, 2018, the entire contents of which is hereby incorporated by reference for all purposes.

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

Figure 1:
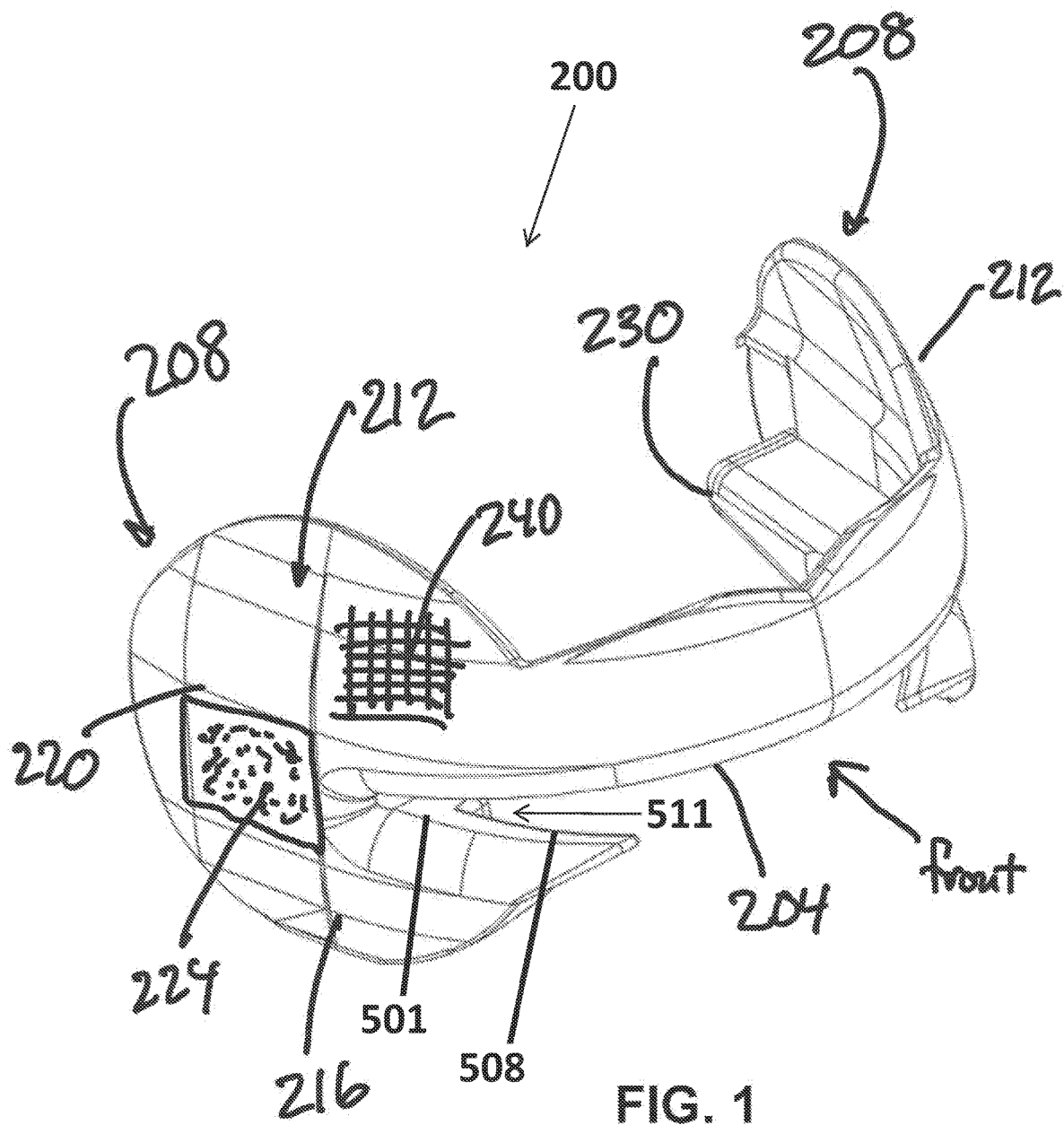
FIG. 1 is a front perspective view of a mucositis treatment device, in accordance with an aspect of the present disclosure.

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure.

It is to be understood that the present disclosure is not limited in its application to the details of construction and the arrangement of the components or steps set forth in the following description or illustrated in the drawings as it is capable of implementations or of being practiced or carried out in various ways. Also, it is to be understood that the phraseology and terminology employed herein are for description only and should not be regarded as limiting.

Certain features are, for clarity, described in the context of separate implementations and may also be provided in combination in a single implementation. Conversely, various features, that are, for brevity, described in the context of a single implementation, may also be provided separately or in any suitable sub-combination.

A major disadvantage of existing mucositis therapies is that they remain at the site of application for a very short period of time, typically about 10 minutes or less. Treatments applied to the oral mucosa in the forms of gels, mouthwashes, ointments, etc., are quickly diluted by oral saliva and are subsequently swallowed by the patient, resulting in very short contact time with the areas affected by oral mucositis. Thus, treatments do not remain concentrated at the areas that are affected by oral mucositis and are systemically absorbed, reducing their efficacy for treating the condition and increasing their potential for systemic toxicity.

Broadly, as described herein, aspects of the present invention provide a device and method of treating diseases or disorders that affect the oral cavity and which are amenable to treatment with locally applied therapeutic agents (also referred to herein as active agents, drugs or medicaments). In some embodiments, the device and method are useful for treating oral mucositis that may entail delaying, inhibiting the onset of, or reducing the severity or duration of mucositis. A combination of the active (e.g., anti-mucositis) agent (also referred to herein as medication or treatment) and the device increases the retention time of the agent on the affected mucosal tissue. The increased retention time may enhance the efficacy of the agent. In addition, by covering and partially blocking the ostia of the parotid glands and some portions of the sublingual glands, salivary dilution of topical agents, particularly the portion of the medication that is adherent to the tongue is decreased.

In some embodiments the agent may be administered topically in the mouth, followed by placement of the device that is brought into direct contact with and covers the treated mucosal tissue. In other embodiments, the medication may be applied to, or coated onto, the device beforehand. This approach may also provide a more targeted delivery of the agent to the affected mucosal tissue, as well as an increase in retention time. In yet other embodiments, the medication may be applied to the affected tissue, followed by insertion of the device having additional medication dispersed therein.

In addition to oral mucositis, aspects of the present invention are directed toward treatments of other oral diseases or disorders such as leukoplakia, i.e., precancerous lesions in the mouth and primary xerostomia.

The device, in accordance with aspects of the present disclosure set forth herein, can be comfortably held in the mouth for prolonged periods of time and therefore extend the contact time of an active (e.g., anti-mucositis) agent on the oral mucosa. Thus, aspects of the present disclosure may provide one or more advantages such as an increase in the concentration and duration of contact of the active (e.g., anti-mucositis) agent with the area(s) of mucosa that is/are, or could be, affected with the oral disease or disorder such as oral mucositis; a decrease in systemic toxicity of the active agents as the agents may be administered in lower doses that will remain within the oral cavity longer and will, therefore, have lower systemic absorption from being swallowed; and further an increase in topical pharmacologic activity at the site of release, i.e., the oral mucosa, compared to conventional methods of direct delivery of substances onto the oral mucosa such as spray and gel forms of these medications. Still further, aspects of the present disclosure may diminish salivary dilution of topical treatments by covering and partially blocking the ostia of the parotid glands and some of the salivary gland ostia.

Broadly, the present inventive methods utilize a combination of an active agent and a device that increases the retention time of the agent on the affected mucosal tissue. The increased retention time may enhance the efficacy of the agent. In some embodiments the agent may be administered topically in the mouth, followed by placement of the device that is brought into direct contact with and covers the treated mucosal tissue. In other embodiments, the medication may be applied to or coated onto the device beforehand. This approach may also provide a more targeted delivery of the agent to the affected mucosal tissue, as well as increase retention time. In yet other embodiments, the medication may be applied to the affected tissue, followed by insertion of the device having additional medication dispersed therein.

Devices suitable for use in the present methods may have several individual components. The first component of the device is an oral retention or fitting portion that functions to comfortably hold the device in the mouth by fitting over the teeth where it can be held for a predetermined period of time or treatment. The fitting portion of the device may fit over the upper teeth, the lower teeth, both the upper and lower teeth or a portion of either or both the upper or lower teeth. This portion of the device may be preconstructed to fit any size mouth. Alternatively, it may be made of a pliable material that can be fitted to the specific patient, either by the patient or by a medical professional such as a dentist. This portion of the device may be constructed of materials that will fit the needs of the device in terms of biocompatibility, ease of device cleaning, and the stability of the material within the mouth. The fitting portion may be made using materials, e.g., poly (methyl methacrylate), polyurethane, and co-polymers of vinyl acetate or ethylene. Other materials include polyvinylacetate-polyethylene or ethylene vinyl acetate (EVA) copolymer, polyvinylchloride, latex rubber, acrylic resin and other laminated or non-laminated thermoplastics. In some embodiments, the materials for construction may also include a dual layering of a soft material on the inside portion and a hard acrylic outside portion that holds the device firmly to the teeth and forms a protective shell for the device.

One or more other covering portions of the device are designed to fit or cover at least the major parts of the mouth that are affected by the oral disease or disorder. These covering portions of the device may be constructed of soft materials that rest gently along the mucosa (lining) of the cheeks (called the buccal mucosa), the inner portions of the lips, the palate and the mucosa underneath the tongue. These portions of the device may be constructed of materials such as latex, synthetic polyisoprene, nitrile, polyurethane resin, plastic, polyester, acrylic resin pads, silicone, polypropylene, low density polyethylene, and various laminates or layered soft/soft laminates. In some embodiments, laminates may feature a top layer of denser vinyl for memory and abrasion resistance and a soft pliable bottom layer for patient comfort.

The covering portion of the device may include an additional layer of semi-porous material that will be in contact with the oral mucosa. This will allow for anti-mucositis agents to be placed or disposed on the device, so they may be gradually released onto the affected tissue. Representative examples of materials that may be used for this part of the device include materials used for wound dressings such as thin, semi-permeable polyurethane films coated with a layer of acrylic adhesive. Other materials, such as gels may be incorporated into the mucosal (i.e., inner) side of the covering portion of the device. The use of gels allows a soft, generally water-soluble material to adhere to this portion of the device. Active agents such as antibiotics and local pain relieving drugs can be mixed into or incorporated into the matrix of the gels. Examples of such gels include carboxymethylcellulose-based gels and alginate-based gels. In some embodiments, the inner portion may include foam-like materials. Foam materials provide a soft interface with the affected oral mucosa. Active agents may be held within the matrix of these foam-like materials. In addition, the material used for the internal layer of the covering portion of the device that is in contact with the mucosa may include drug-eluting fibers. These may include monolithic polymer fibers and reservoir fibers such as polyactic acid (PLLA) in which the drug is dissolved or dispersed. Other materials that may be used for the internal portion of this part of the device include nanoporous materials such as ceramics, composites, metals, and polymeric organic substances. Other examples of materials include nanoporous oxides, including alumina, titania, silica, zirconia, polycarbonate, polyethylene terephthalate, polysulfide and polymers combined with ceramics. Nanoporous materials may be produced by anodization, lithography, focused ion beam etching, ion-tracking etching, phase separation and sol-gel processes.

Thus, in some embodiments, the device may have an upper part that fits on upper teeth (e.g., upper front teeth) and has a covering portion that drapes across the palate and the inner part of the upper lip. The device may have a lower part that fits on lower teeth (i.e., lower front teeth) and has a covering portion that drapes across the sublingual mucosa and inner portions of the cheek (the buccal mucosa). Devices may also have adjustable components that allow the device to fit snugly and comfortably in the mouth of an affected patient. Thus, both the upper and lower parts of the device may contain a system that allows for adjustment of these portions of the device to fit comfortably in the mouth. Adjustments can be made to shorten or lengthen the device as well as to elevate of lower the device to assist with fitting of the apparatus for comfortable and prolonged use.

Additional modifications of the device may be made in order to optimize fitting in the mouth and for individualizing the construction of the device based on the patient's oral anatomy. Such modifications may be made with the use of imaging methods such as radiographic procedures and 3-dimensional photographic imaging. Furthermore, the use of dental-type molds may be used to optimize sizing of the device for individual patients. Yet further modifications may include addition of materials such as padding and anchoring portions of the device to add to the comfort level of its use. Other modifications may be made based on methods to size the individual portions of the device to optimize covering of the affected area of the oral mucosa. Further modifications may be performed to allow the device to be worn overnight.

The active agents may be applied to the covering portion(s) of the device that come into contact with the affected mucosal tissue. The use of semi-porous materials to line these portions of the device, imparts sustained release properties to the device which allow for gradual and prolonged exposure of the mucosa to the agents. In some embodiments, the medications may be first applied to the affected area(s), followed by placement of the device in the mouth. Using this method, the device holds the medications in place and allows their prolonged contact with the mucosa.

An oral treatment device 200, as shown in FIG. 1, in accordance with an aspect of the present disclosure, is suitable for use with the methods described herein. The device 200 may have several individual components or portions, however, it should be noted that "component" does not necessarily mean a separate piece or pieces unless specifically set forth as such. The device 200 includes a curved, or arcuate, oral retention or fitting portion or body 204 that can be comfortably held for a predetermined period of time or treatment. The fitting portion 204 of the device 200 has an arc that generally corresponds to the arrangement of teeth in the human mouth, i.e., the dental arche, and may fit over the upper teeth, the lower teeth, both the upper and lower teeth or a portion of either or both the upper or lower teeth.

The device 200 may be preconstructed to fit any size mouth. Alternatively, it may be made of a pliable material that can be fitted to the specific patient, either by the patient or by a medical professional such as a dentist. The device 200 may be constructed of materials that meet biocompatibility requirements for human use, ease of device cleaning and the stability of the material within the mouth. The device 200 may be made using materials including, e.g., poly(methyl methacrylate), polyurethane and co-polymers of vinyl acetate or ethylene. Other materials that could be used include polyvinylacetate-polyethylene or ethylene vinyl acetate (EVA) copolymer, silicone rubber, polyvinylchloride, latex rubber, acrylic resin and other laminated or non-laminated thermoplastics.

The device 200 includes symmetrically provided covering portions 208, each having an upper wing portion 212 and a lower wing portion 216 configured to fit or cover parts of the mouth that are affected by mucositis. These covering portions 208 of the device 200 are generally more flexible (e.g., compliant or softer) than the body portion 204 by, for example, being thinner than the body portion 204 or being of a different material. The covering portions 208 rest along the sensitive mucosa (lining) of the cheeks (called the buccal mucosa), the inner portions of the lips, the palate and the mucosa underneath the tongue.

These covering portions 208 of the device 200, in one aspect of the present disclosure, may be constructed of materials, in addition to those materials listed above, such as latex, synthetic polyisoprene, nitrile, polyurethane resin, silicone rubber, plastic, polyester, acrylic resin pads, silicone, polypropylene, low density polyethylene and various laminates or layered soft/soft laminates. In some embodiments, laminates may feature a top layer of denser vinyl for memory and abrasion resistance and a soft pliable bottom layer for patient comfort. Further, the choice of materials for the device 200 provides a predetermined amount of "spring load" that urges the covering portions 208 outward as represented by the arrows A in FIG. 3.

The covering portions 208 of the device 200 have an exterior surface 220 that may include an additional layer 224 of semi-porous material that will be in contact with the oral mucosa. This semi-porous layer 224 will allow for anti-mucositis agents to be placed or disposed on the device 200, in order to be gradually released onto the affected tissue. Representative examples of materials that may be used for this part of the device include materials used for wound dressings such as thin, semi-permeable polyurethane films coated with a layer of acrylic adhesive.

Other materials, such as gels, may be incorporated onto the exterior surface 220 of the covering portion 208 of the device 200. The use of gels allows a soft, generally water-soluble material to adhere to this portion of the device 200. Medications such as antibiotics and local pain relieving drugs can be mixed into or incorporated into the matrix of the gels. Examples of such gels include carboxymethylcellulose-based gels and alginate-based gels.

Referring again to FIG. 1, each covering portion 208 and its respective upper and lower wing portions 212, 216 are made of softer or more flexible material, as set forth above. The upper wing portions 212 extend above the upper gum line to cover or contact a portion of the upper inner cheek, and the inner upper lip, while the lower wing portions 216 extend below the lower gum line to cover or contact a portion of the lower inner cheek. In addition, the upper and lower wing portions 212, 216 cover the openings for the parotid duct and a number of salivary glands.

In one embodiment of the device 200, a portion of the external surface 220 may be treated to provide a micro-textured surface 240 that results in small reservoirs being created, as shown in FIG. 1. The micro-textured surface 240 may be provided in the device 200 by etching a pattern into the mold that is used to make the device 200. Alternatively, the external surface 220 of the device 200 may be modified by etching or sand-blasting once freed from the mold. These small reservoirs serve to retain in place therapeutic materials that have been applied to the inner cheek to treat mucositis. Advantageously, the medicine is then in place longer before it is washed away by saliva. Alternatively, the therapeutic material may be "loaded" onto the micro-textured surface 220 before the device 200 is placed in the mouth which may aid in application to the inner mucosa.

In some embodiments, the covering portion 208 may include foam-like materials. Foam materials provide a soft interface with the affected oral mucosa. Medications may be held within the matrix of these foam-like materials.

In addition, the material used for the exterior surface 220 of the covering portions 208 of the device 200 that is in contact with the mucosa may include drug-eluting fibers. These fibers may include monolithic polymer fibers and reservoir fibers such as polylactic acid (PLLA) in which the drug is dissolved or dispersed.

Still further, other materials that may be used on the exterior surface 220 of the covering portion 208 include nanoporous materials such as ceramics, composites, metals and polymeric organic substances. Other examples of materials include nanoporous oxides, including alumina, titania, silica, zirconia, polycarbonate, polyethylene terephthalate, polysulfide and polymers combined with ceramics. Nanoporous materials may be produced by anodization, lithography, focused ion beam etching, ion-tracking etching, phase separation and sol-gel processes.

The body portion 204 includes an upper portion configured to cover the mucosa between the upper teeth and the gums and the upper inner lip. Advantageously, this aids in retention of the device 200 within the mouth by holding it in place between the upper inner lips and upper teeth. This portion is constructed of thinner or more pliable material for comfort and for holding medication in place in that area of the mouth.

Figure 2:
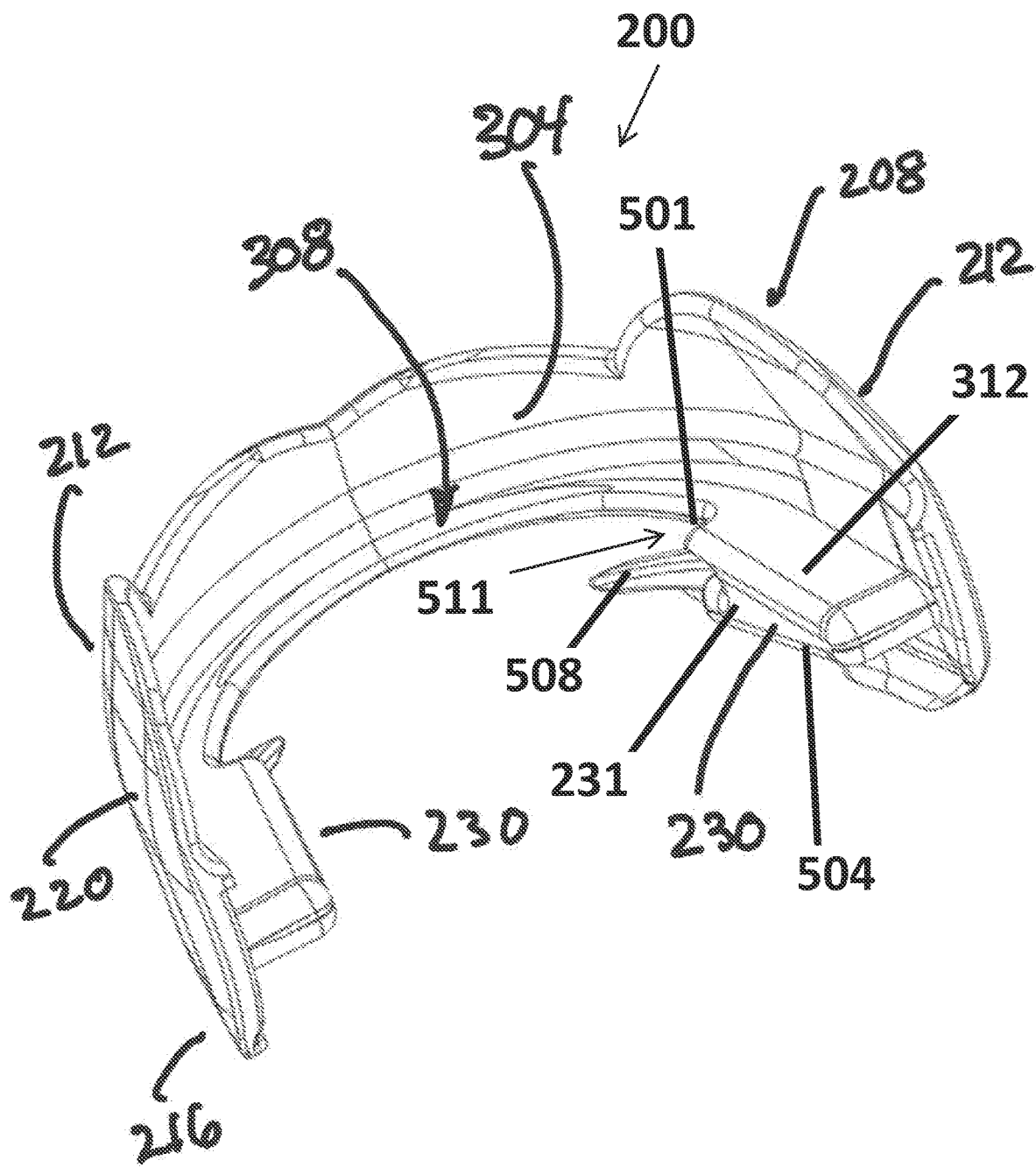
FIG. 2 is a rear perspective view of the device of FIG. 1.
Figure 4:
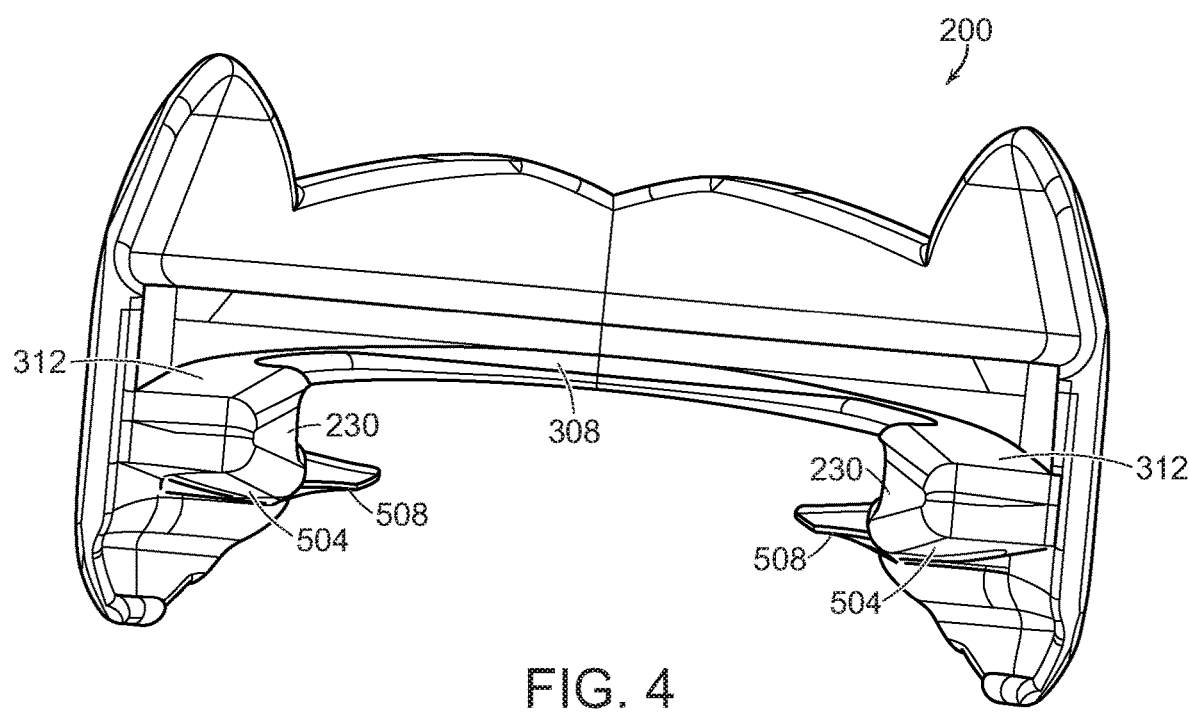
FIG. 4 is a rear perspective view of the device of FIG. 1.

Referring to FIGS. 2 and 4, each of which is a rear perspective view, the device 200 may include symmetrically opposed bite flanges 230 that extend from an interior surface 304. In addition, an upper ledge 308 also extends from the interior surface 304 and when the device 200 is placed in the mouth of a patient, the upper teeth of the patient may rest thereon.

Figure 3:
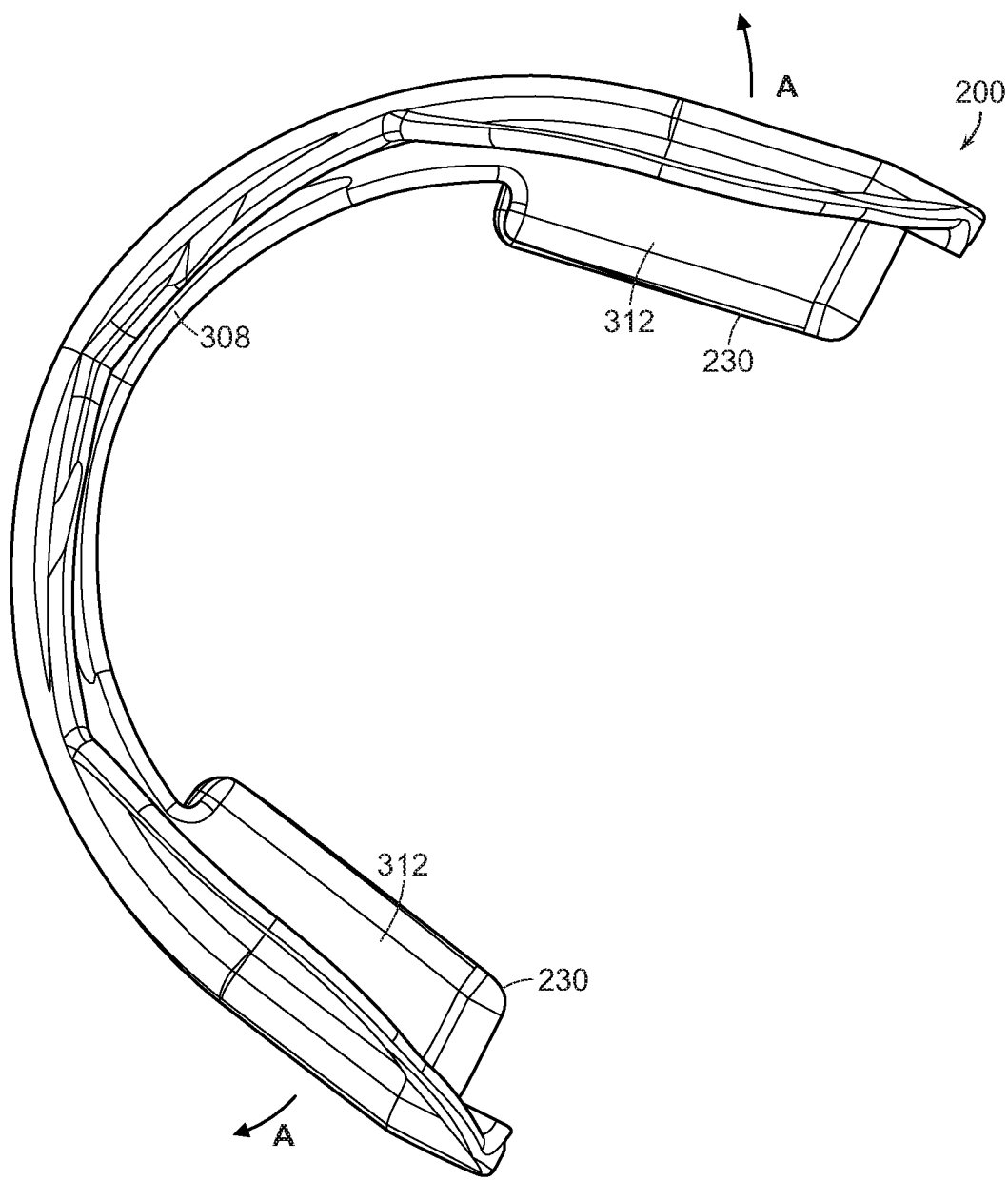
FIG. 3 is a top view of the device of FIG. 1.
Figure 5:
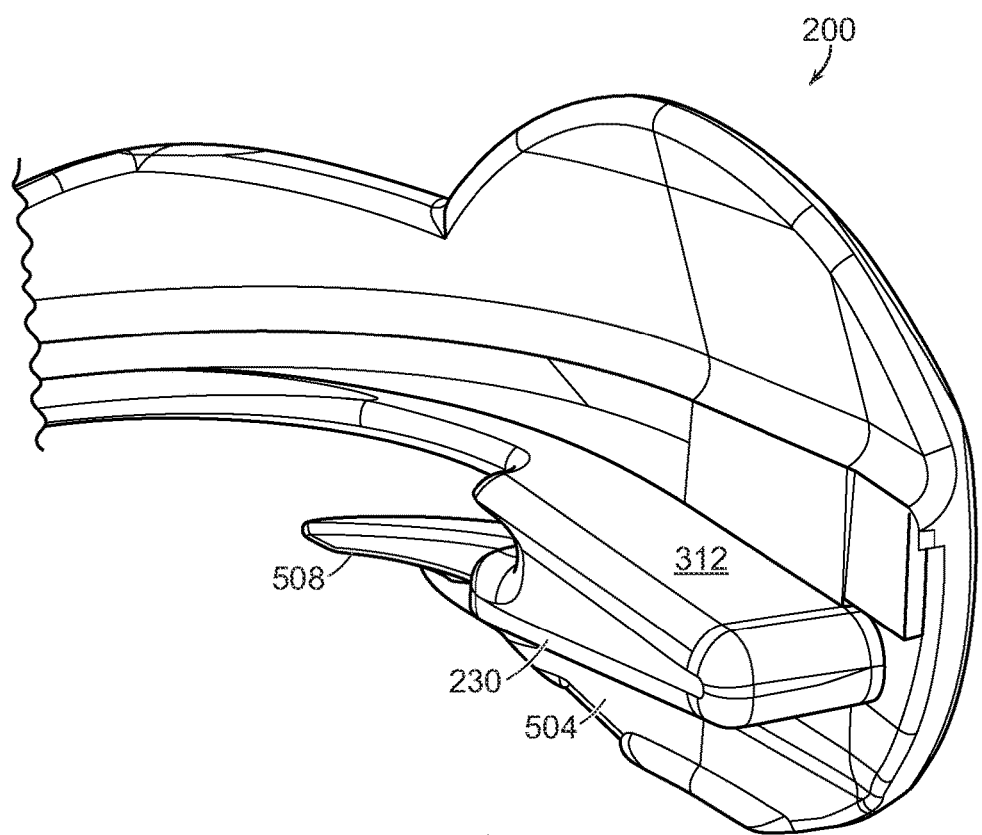
FIG. 5 is a magnified rear perspective view of a portion of the device of FIG. 1.

As shown in FIGS. 1 and 2 and in FIG. 3, which is a top view of the device 200, the upper ledge 308 is continuous around an inner arc of the device 200 and is contiguous with an upper bite surface 312 of the bite flanges 230. Each bite flange 230 includes a lower bite surface 504 that, in conjunction with the upper bite surface 312, forms a bite wedge 231. When the device 200 is placed in the patient's mouth, the top teeth will rest on the upper ledge 308 and some of the upper and lower back teeth, e.g., mid-molars, can bite down on the upper and lower bite surfaces 312, 504 of the bite flange 230. In this manner, the device 200 can be held in place with minimal effort. The bite flange 230 is made of softer or spongier material that the patient can bite down on without becoming fatigued too quickly. In addition, each lower wing portion 216 further includes a v-shaped notch 501 being positioned adjacent each bite wedge 231 towards the middle section 204. Wherein, the lower surface edge along the middle section of the fitting portion extends arcuately towards each lower wing portion the v-shaped notch 501 defines a gap 511 between the lower surface edge and the lower tab 508 extending from the lower bite flange 504;

As shown in FIGS. 4 and 5, and as seen from the back of the device 200, symmetric lower tabs 508 are provided forward of each respective bite flange 230. The lower tabs 508 rest on some of the lower teeth forward of those that are biting down on the bite flanges 230. The lower tabs 508 provide additional stability and absorb some stress from the patient holding on, i.e., biting down, on the bite flanges 230.

Figure 6:
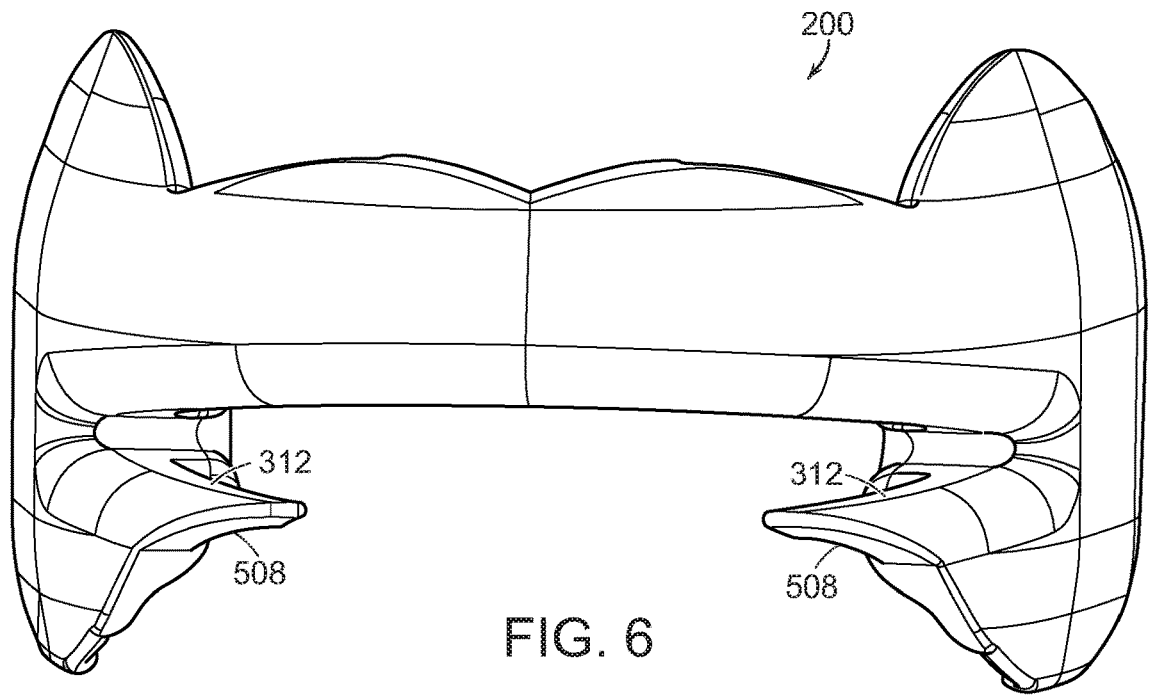
FIG. 6 is a front view of the device of FIG. 1.

As shown in FIG. 6, which is a front view of the device 200, the lower tabs 508 may extend around a portion of the arc of the lower teeth. In another embodiment, the lower tabs 508 may extend all the way around the arc into a single lower tab, i.e., a continuous piece for all of the lower teeth to contact.

Figure 7:
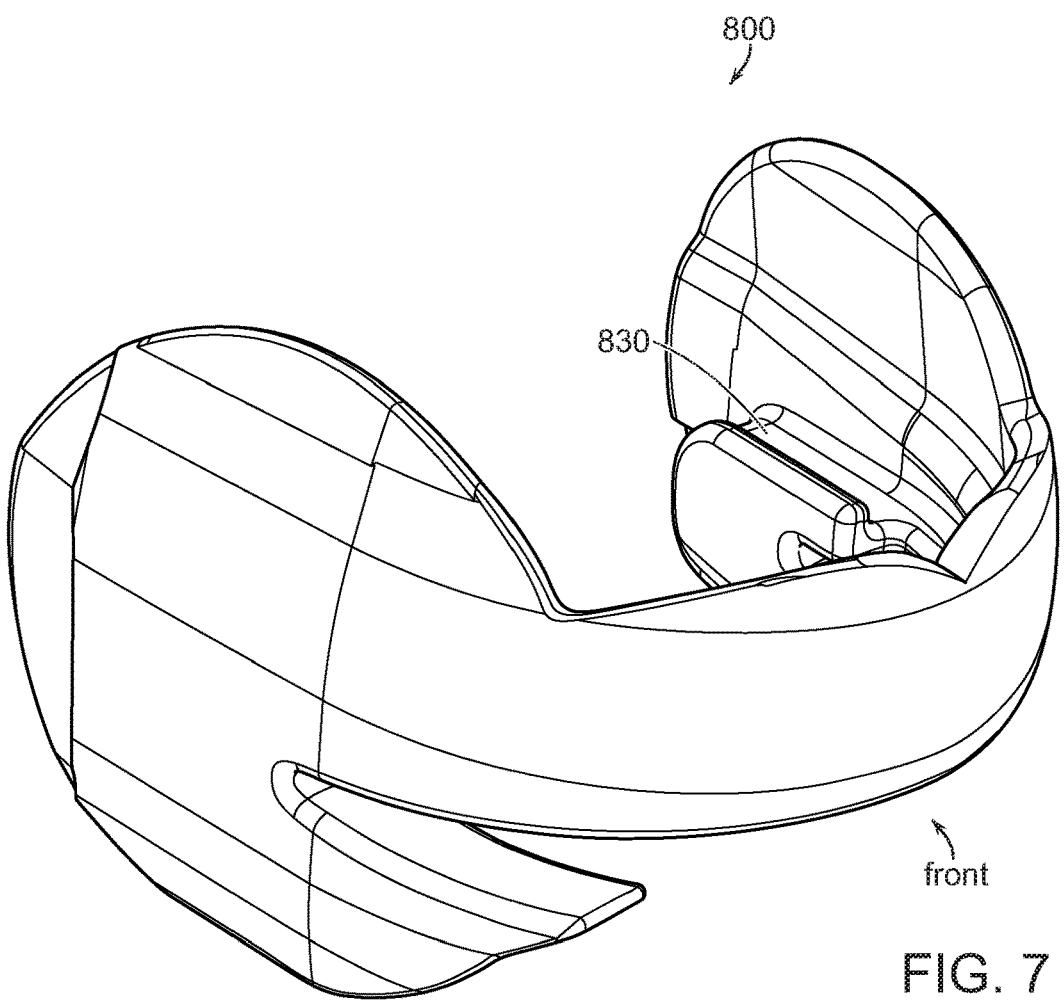
FIG. 7 is a front perspective view of a mucositis treatment device, in accordance with another aspect of the present disclosure.

Referring now to FIG. 7, another mucositis treatment device 800, in accordance with an aspect of the present disclosure that is suitable for use with the methods described herein is presented from a front perspective view. The device 800 is similar to the device 200 as set forth above, however, the device 800 includes symmetrically opposed bite flanges 830 that differ from the bite flanges 230 described above.

Figure 8:
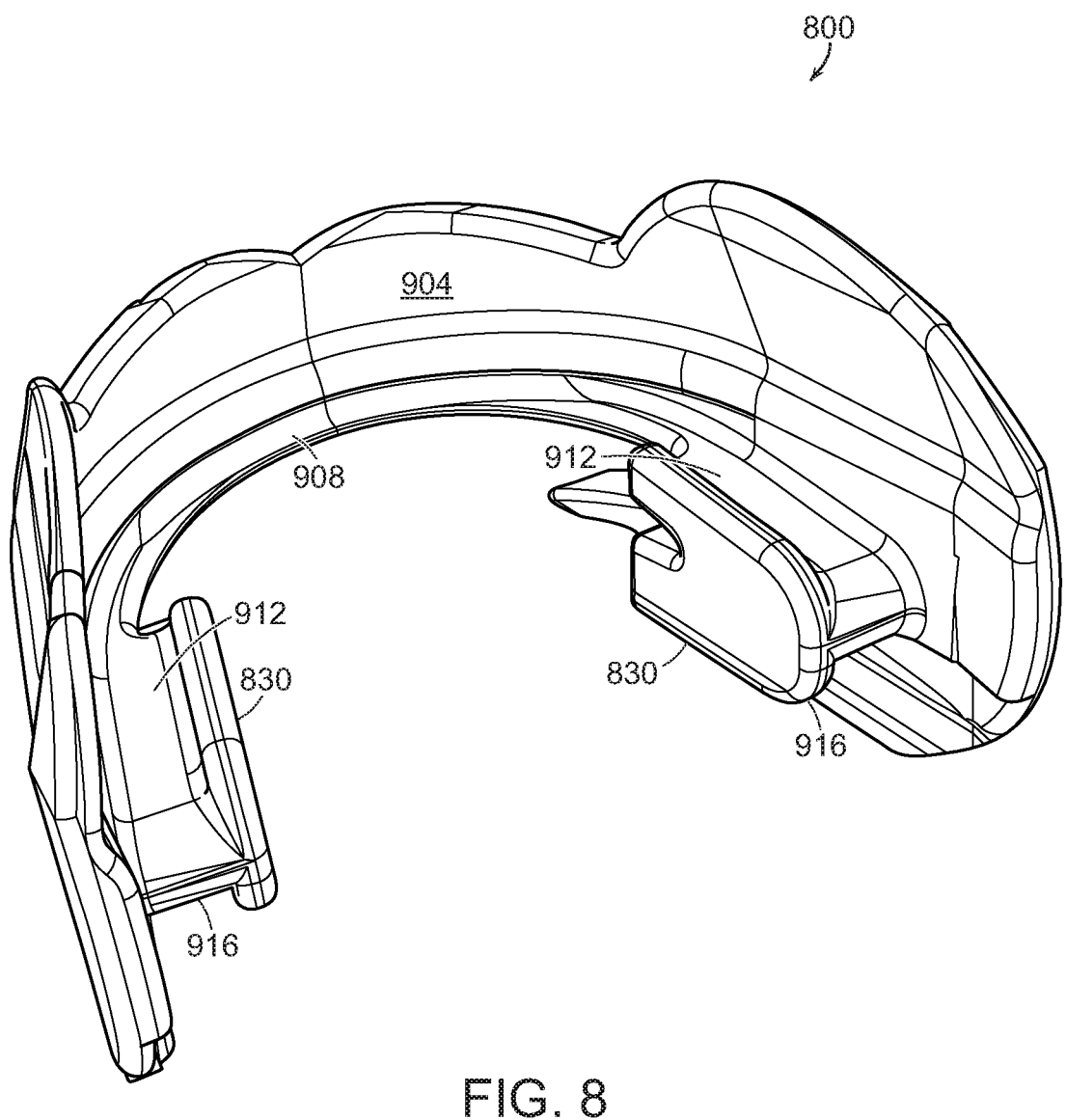
FIG. 8 is a rear perspective view of the device of FIG. 7.
Figure 9:
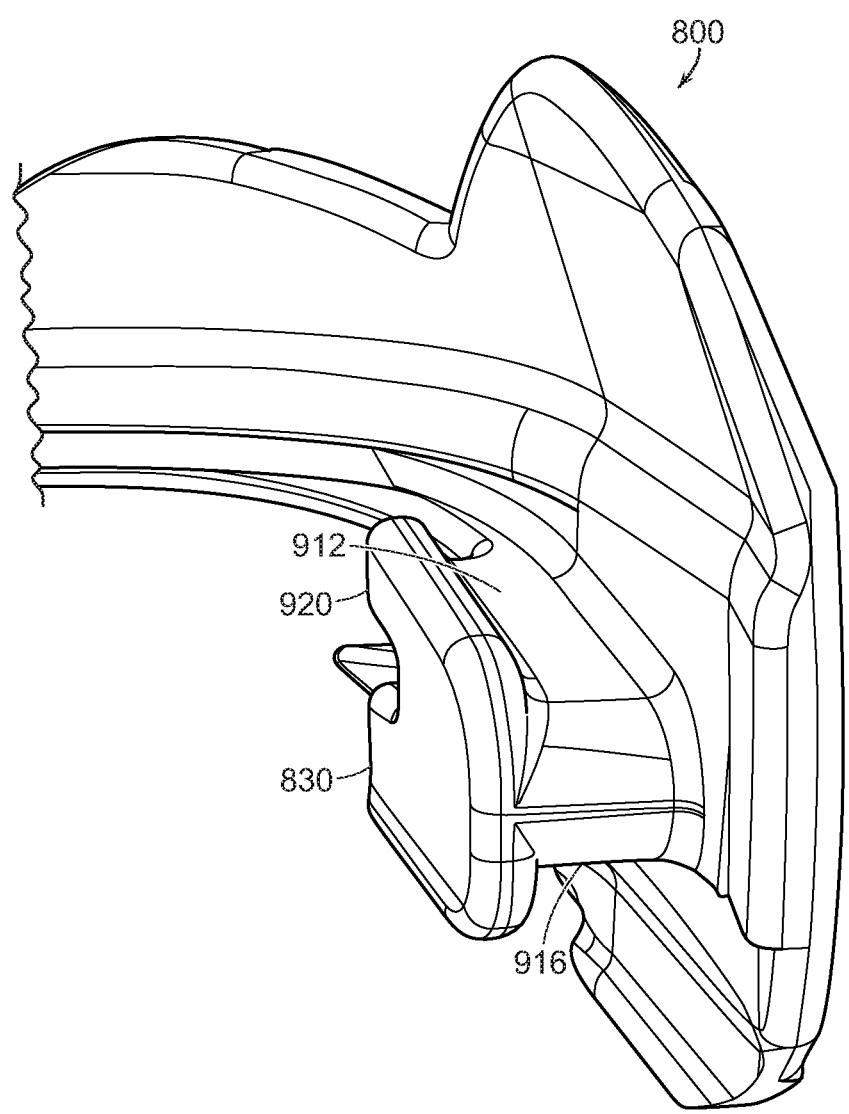
FIG. 9 is a magnified rear perspective view of a portion of the device of FIG. 7.

As shown in FIGS. 8 and 9, the bite flanges 830 extend from an interior surface 904. An upper ledge 908 also extends from the interior surface 904 and when the device 800 is placed in the mouth of a patient, the upper teeth of the patient may rest thereon. The upper ledge 908 is continuous around an inner arc of the device 800 and is contiguous with an upper bite surface 912 of the bite flanges 830. Each bite flange 830 includes a lower bite surface 916. When the device 800 is placed in the patient's mouth, the top teeth will rest on the upper ledge 908 and some of the upper and lower back teeth, e.g., mid-molars, can bite down on the upper and lower bite surfaces 912, 916 of the bite flange 830. In this manner, the device 800 can be held in place with minimal effort. Each bite flange 830 is made of softer or spongier material that the patient can bite down on without becoming fatigued too quickly.

In addition to the upper and lower bite surfaces 912, 916, the bite flange 830 includes a guide ridge 920 that is generally transverse to the upper and lower bite surfaces 912, 916. The guide ridge 920 provides a space to line up the upper teeth in order to maintain the device 800 in position. Advantageously, the patient need not bite down on the bite flange 830 to keep the device 800 in place in the mouth with the side portions positioned against the inner cheeks.

Additional modifications of the device may be made in order to optimize fitting in the mouth and for individualizing the construction of the device based on the patient's oral anatomy. Such modifications may be made with the use of imaging methods such as radiographic procedures and 3-dimensional photographic imaging. Furthermore, the use of dental-type molds may be used to optimize sizing of the device for individual patients. Yet further modifications may include addition of materials such as padding and anchoring portions of the device to add to the comfort level of its use. Other modifications may be made based on methods to size the individual portions of the device to optimize covering of the affected area of the oral mucosa. Further modifications may be performed to allow the device to be worn overnight.

Advantageously, the designs of the devices described above follow the contour of the mouth for comfort. The bite flanges provide surfaces for both the upper and lower teeth to close on and hold the device in place. In one aspect, the device is configured to be located over only the upper teeth as this provides additional comfort compared to devices that fit over both the upper and lower teeth, in addition to making it easier for the patient to breathe while the device is in place. Still further, a device where only the upper teeth are covered allows for easy elimination of saliva without the necessity to remove the device.

The side portions between teeth, gums and inner lips provide coverage of gums, upper oral mucosa and inside of upper lip and a portion of the lower lip allowing for increased mucosal coverage and which also helps to hold the device in place.

The active (e.g., anti-mucositis) agents may be applied to the covering portion(s) of the device that come into contact with the affected mucosal tissue. The use of semi-porous materials to line these portions of the device, imparts sustained release properties to the device that allow for gradual and prolonged exposure of the mucosa to the agents. In some embodiments, the medications may be first applied to the affected area(s), followed by placement of the device in the mouth. Using this method, the device holds the medications in place and allows their prolonged contact with the mucosa.

When the device is held within the mouth, the anti-mucosal agents remain in contact with the oral mucosa that is affected by mucositis for a predetermined time or treatment period which for purposes of the present invention, may include a contact time of 10 minutes, 20 minutes, 30 minutes, 60 minutes, 90 minutes, 120 minutes, 150 minutes, 180 minutes, 210 minutes, 240 minutes or more. In some embodiments, methods entail the device being held in the mouth for about 10 minutes to up to 2 hours at a time. The method may be conducted multiple times per day, for example, but not limited to, from 1-4 times daily.

Broadly, any agent that exerts a therapeutic or prophylactic effect when topically applied to mucosal tissue may be suitable for use in the present invention, types of which include mucosal-adherent substances, mucosal protectant agents, anti-oxidants, antibiotics and oral analgesics. Representative examples of both classes of agents and specific agents that may be suitable for use in the present invention are listed in Table 1 and natural substances for treatment of oral mucositis and other oral conditions are listed in Table 2. Representative examples of mucoadhesive polymers that may also be used in accordance with aspects of the present disclosure, are listed in Table 3. Treatment of oral mucositis may also entail use of the compositions listed in Table 4.

TABLE 1

Pharmaceuticals

1) Benzydamine mouthwash
2) Doxepin mouthwash
3) 0.2% morphine mouthwash
4) Palifermin, a truncated human recombinant keratinocyte growth factor (KGF)

Antioxidant Agents

1) Glutamine
2) Oral Zinc Supplement
3) Vitamin E
4) N-Acetyl-Cysteine (NAC)
5) Superoxide Dismutase Mimetics Inflammation and Cytokine Production-Inhibitors 1) Production-Inhibitors
2) Pentoxifylline
3) Salicylates
4) Interleukin Inhibitors Other Biological Modifiers in Development 1) Smad7 inhibitors
2) TGFb inhibitors
3) NF-kB inhibitors
4) Dusquetide-an innate immune inhibitor
5) Topical formulation of clonidine
6) Trefoil factor 1 released by genetically modified *Lactococcus lactis* bacteria
7) 7) EC-18, primarily directed at neutropenia Cytoprotective Agents 1) Prostaglandin analogs
2) Sucralfate in various formulations Growth Factors 1) Palifermin
2) Granulocyte-macrophage colony-stimulating factor(GM-CSF),
3) Granulocyte colony-stimulating factors (G-CSF, e.g., filgrastim)
4) FGF TABLE 1-continued Antiapoptotic Agents 1) Anti-chemokine ligand 9 (CXCL9)
2) Specific caspase-3 inhibitors
Probiotics including *Lactobacillus* species Antibiotics 1) Chlorhexidine
2) Other topical antibiotics Other Agents 1) Glucagon-Like Peptide-2 (GLP-2) analogs
2) Vitamin A
3) Vitamin E
4) Ascorbic acid
5) Chamomile
6) Curcumin
7) Other plant extracts Topical Mucosal Protectant Agents 1) Sucralfate
2) Polymerized sucralfate in pastes and other forms including ProThelial ™
3) Oral mucoadhesive hydrogels including MuGard ™
4) Polyvinylpyrrolidone-sodium hyaluronate gels including Gelclair ™

Treatments for dysgeusia and dry mouth

1) Zinc
2) Alpha lipoic acid (ALA)
3) Marinol
4) Megestrol acetate
5) Synsepalum dulcificum
6) Topical clonazepam
7) Duloxetine
8) Other antidepressants
9) Gabapentin
10) Pregabalin
11) Other anti-epileptics
12) Amisulpride
13) Capsaicin
14) Local salivary stimulants
15) Lemon flavored sprays, ointments, rinses, gels and creams
16) Saliva substitutes containing substances with an aqueous component supplemented with calcium, phosphate and fluoride ions. These would include sprays, ointments, rinses, gels and creams

TABLE 2

Natural mucopolysaccharides

1) Alginate
2) Hyaluronic acid
3) Okra polysaccharide
4) Honey
5) Bee propolis
6) Manuka honey
7) *Aloe vera*
8) CBD (cannabidiol) oil

TABLE 3

| Criteria | Categories | Pharmacologic agents |
|---|---|---|
| Source | Semi-natural/natural | Agarose, chitosan, gelatin |
| | | Hyaluronic acid |
| | | Various gums (guar, hakea, xanthan, gellan, carragenan, pectin and sodium alginate) |
| | Synthetic | Cellulose derived |
| | | [CMC, thiolated CMC, sodium CMC, HEC, HPC, HPMC, MC, methylhydroxyethylcellulose] |
| | | Poly(acrylic acid)-based polymers |
| | | [CP, PC, PAA, polyacrylates, |

TABLE 3-continued

| Criteria | Categories | Pharmacologic agents |
|---|---|---|
| | | poly(methylvinylether-co-methacrylic acid), poly(2-hydroxyethyl methacrylate), poly(acrylic acid-co-ethylhexylacrylate), poly(methacrylate), poly(alkylcyanoacrylate), poly(isohexylcyanoacrylate), poly(isobutylcyanoacrylate), copolymer of acrylic acid and PEG] |
| | | Others |
| | | Poly(N-2-hydroxypropyl methacrylamide) (PHPMAm), polyoxyethylene, PVA, PVP, thiolated polymers |
| Aqueous solubility | Water-soluble | CP, HEC, HPC (waterb 38 8C), HPMC (cold water), PAA, sodium CMC, sodium alginate |
| | Water-insoluble | Chitosan (soluble in dilute aqueous acids), EC, PC |
| Charged agents | Cationic | Aminodextran, chitosan, dimethylaminoethyl (DEAE)-dextran, trimethylated chitosan |
| | Anionic | Chitosan-EDTA, CP, CMC, pectin, PAA, PC, sodium alginate, sodium CMC, xanthan gum |
| | Non-ionic | Hydroxyethyl starch, HPC, poly(ethylene oxide), PVA, PVP, scleroglucan |
| Bioadhesive force type | Covalent bonded | Cyanoacrylate |
| | Hydrogen bond | Acrylates [hydroxylated methacrylate, poly(methacrylic acid)], CP, PC, PVA |
| | Electrostatic interaction | Chitosan |

TABLE 4

Caphosol ™-A mouth rinse designed to moisten, lubricate and clean the oral cavity including the mucosa of the mouth, tongue and oropharynx. Ingredients include: Disodium phosphate 0.052%, Monosodium phosphate 0.009%, Calcium chloride 0.052%, Sodium chloride 0.569% and Purified water.-commercial product
MuGard ™-Oral Mucoadhesive containing purified water, glycerin, benzyl alcohol, sodium saccharin, Carbomer Homopolymer A, potassium hydroxide, citric acid, polysorbate 60 and phosphoric acid.-commercial product
Prothelial ™-Polymerized cross-linked sucralfate malate paste-commercial product
Sucralfate slurry-commercial and generic product
Sucralfate-commercial product
Viscous lidocaine-commercial product and generic
Magic mouthwash-contains a variety of ingredients that may include magnesium aluminum hydroxide, viscous lidocaine, and diphenhydramine-commercial product and compounded product
PTA (polymyxin, tobramycin, amphotericin B) antimicrobial paste-commercial product
BCoG (bacitracin, clotrimazole, gentamicin) antimicrobial paste
Palifermin-commercial product, not topical
Nepidermin (brand name Easyef), also known as recombinant human epidermal growth factor (rhEGF)-commercial product
Palifermin-commercial product, not topical
Innovation Pharma's Brilacidin-OM, an oral rinse version of the company's defensin-mimetic Brilacidin, a novel synthetic, non-peptidic small molecule shown to have a dynamic mechanism of action that demonstrates antibiotic, anti-inflammatory and immunomodulatory properties.-commercial product, in development
Validive ® (clonidine Lauriad ®) is a mucoadhesive tablet based on our Lauriad ® technology that delivers high concentrations of an anti-inflammatory active principle (clonidine) directly in the oral cavity, the site of irradiation in the treatment of head and neck cancer.-commercial product, in development
AG013 delivers the therapeutic molecule Trefoil Factor 1, part of a class of peptides that help protect and repair gastrointestinal tissue, to the mucosal tissues in the oral cavity-commercial product, in development
Antioxidants including but not limited to Glutamine, Oral Zinc, Vitamin E, N-Acetyl-Cysteine (NAC) and Superoxide Dismutase Mimetics
Iseganan antimicrobial mouthwas
Misoprostol mouthwash
Smad7 inhibitors
TGFb inhibitors
NkB inhibitors
Other forms of topical clonidine
Dusquetide-an innate immune inhibitor
Anti-chemokine ligand 9 (CXCL9)
Specific caspase-3 inhibitors
Probiotics including Lactobacillus species TABLE 4-continued Chlorhexidine
Glucagon-Like Peptide-2 (GLP-2) analogs
Topical morphine-compounded product
Topical clonazepam-compounded product
Topical doxepin-compounded product Yet other anti-mucositis agents are known in the art. In some therapeutic embodiments, the agents include doxepin mouthwash, topical morphine and morphine mouthwash, topical lidocaine and related drugs, polymerized forms of sucralfate, mucoadhesive substances and barrier coatings of the mucosa. Agents that are advantageously used prophylactically include benzamidine-containing mouthwashes and recombinant human keratinocyte growth factor 1. Aside from mouthwashes, other topical treatments for oral mucositis are typically administered in form of gels and sprays. Anti-mucositis agents may be used alone or in combination of two or more such agents. The methods of the present invention may be used in combination with systemic treatment With respect to embodiments of the present invention that are directed to treatment of oral mucositis, the anti-mucositis agents are topically administered to mucosal tissue in a therapeutically effective amount. As persons skilled in the art would appreciate, this amount will vary depending upon the agent itself and other factors which may include one or more of the severity factors of the condition and the general health of the patient. The therapeutic amount may be effective to ameliorate one or more symptoms presented by the patient, e.g., pain, mucosal dryness and oral ulcerations, or even cure the condition.

With respect to aspects of the present invention that are directed to prophylactic uses, the anti-mucositis agent is topically applied to mucosal tissue of a patient suitably prior to an event that is known to induce oral mucositis, e.g., chemotherapy and radiation therapy that are typically used for treatment of cancer, in a prophylactically effective amount. This amount may be effective to delay or inhibit the onset of mucositis, or reduce the severity or duration of mucositis or any symptom associated therewith, or even preventing the onset of the condition. Here again, in these aspects of the present invention, persons skilled in the art will appreciate that prophylactically effective amounts will vary depending upon the anti-mucositis agent and depend other factors which may include one or more of the severity of the condition and the general health of the patient.

A common treatment for the pain of mucositis includes numbing of the entire mouth, including the tongue, for example, by application of viscous lidocaine. Advantageously, using the device along with the topical application of lidocaine markedly increased the numbing effect on the tongue even though the device does not cover the tongue. The tongue is normally bathed by circulating saliva and medications are, therefore, easily washed off. With the device, the openings for the parotid duct and a number of salivary glands are covered, so saliva pools at the lower parts of the mouth by the effect of gravity. This reduces the amount of saliva bathing the tongue and other parts of the mouth, including the cheeks. In turn, this lessens the effect of circulating saliva from diluting topical medications that are present in the mouth and used for treatment of oral mucositis.

Another aspect of the present disclosure provides a kit for administering a therapeutic agent, for example, an anti-mucositis agent, to the mucosal tissue of an individual. The kit may include a device, as described above, a therapeutic amount of the agent and instructions regarding the method of using the device and the agent to treat the affected mucosal tissue area.

The invention will now be described in terms of the following non-limiting examples.

EXAMPLES

Example 1

A test was performed to determine the effectiveness of the device by measuring the quantity of orally placed substances that remain in the mouth over time. A study was performed comparing the retention of alcohol (ETOH) within the mouth over time in a normal volunteer. This study was a comparison of the retention of orally placed ETOH alone, ETOH mixed with alginate gel and a combination of ETOH and alginate followed by placement of an oral mucositis retention device. The comparative data was obtained as a function of ETOH concentration vs time using linear regression analysis.

Figure 10A:
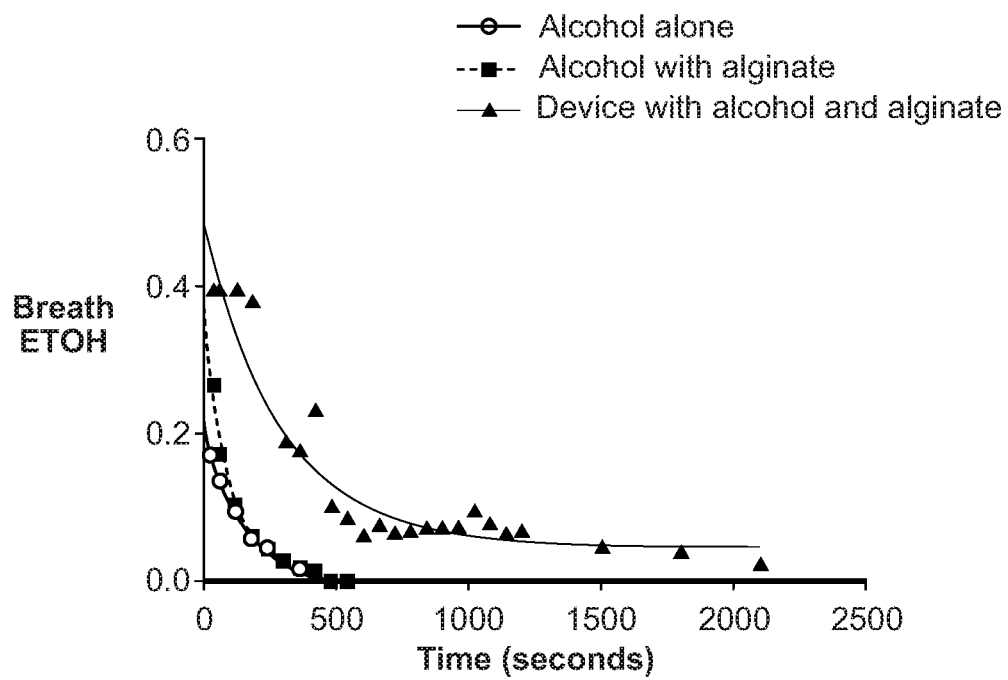
FIG. 10A is a graph that shows the results of an oral retention test in accordance with aspects of the present disclosure.

Referring now to FIG. 10A, the data shows that the use of the device resulted in a prolonged retention of the ETOH alginate gel mixture. This was evidenced by a lower elimination rate constant (k) and a prolongation of half-life (T½) of ETOH within the mouth. Without the device, alginate remained in the mouth for only 8 minutes. More specifically, using the device, the ETOH/alginate combination remained in the mouth for at least 37 minutes (when the study was concluded). A marked increase in area under the curve (AUC) was produced by the device. The AUC for ETOH alone was 24.27 ppm*seconds, for ETOH with alginate was 28.35 ppm*seconds and for ETOH plus device was 217 ppm*seconds. Thus, the method of the present invention increased the total amount of alginate that remained on the mucosal surface almost 8 times the amount without the device.

Example 2

A subject's perception of tongue numbness, per the application of lidocaine with and without the device, was measured. More specifically, a normal subject, i.e., one with normal mouth function, participated in two studies. In the first study, the subject placed 15 mL of 2% viscous lidocaine in the mouth and swished the substance within the mouth for 1 minute. After 1 minute, the viscous lidocaine was expectorated. The subject then determined the degree of numbness of the tongue, at periodic intervals. The degree of numbness was determined by the subject using a Numbness scale from 1 to 10. This scale is a modification of a standard visual analogue pain scale, where a score of 0=no numbness, a score of 5=moderate numbness and a score of 10=extreme numbness. In the second study, the subject placed 15 mL of 2% viscous lidocaine in the mouth and swished the substance within the mouth for 1 minute. After 1 minute, the viscous lidocaine was expectorated and the device was placed and retained in the mouth.

Figure 10B:
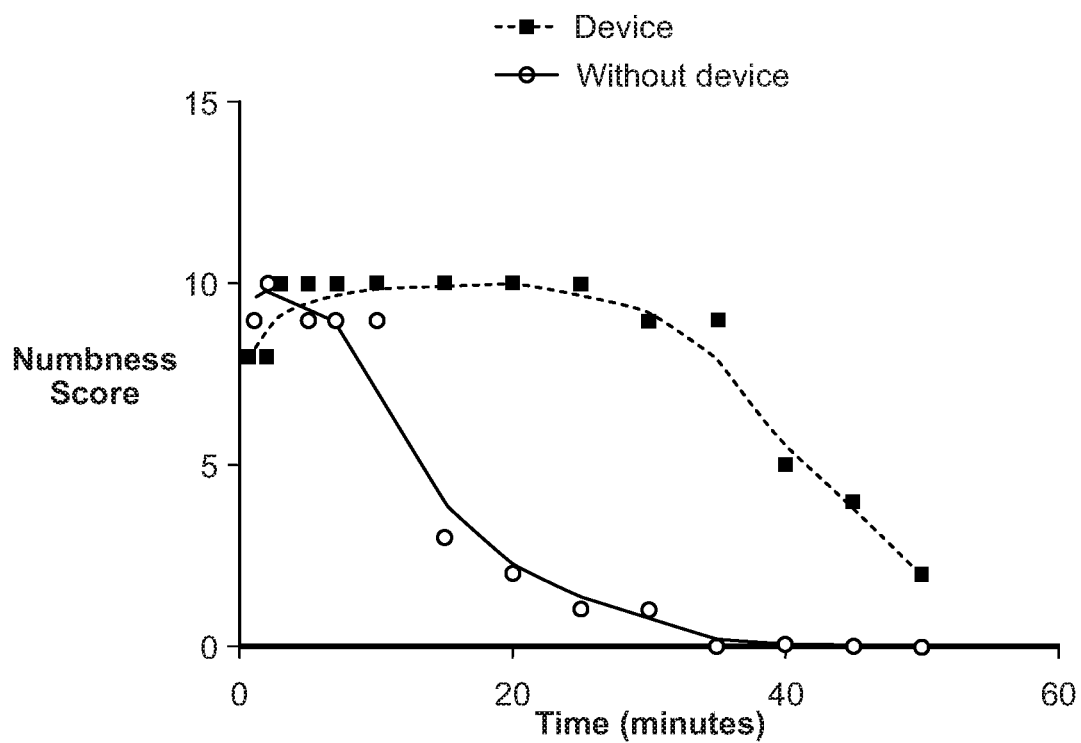
FIG. 10B is a graph that shows the results of an oral retention test, with respect to a subject's perception of numbness, in accordance with aspects of the present disclosure.

Referring now to FIG. 10B, curve fitting was applied to generate data from the Numbness score using the Prism program (GraphPad Software, San Diego, Ca). The curve demonstrates that, with and without the device, the peak degree of numbness (Numbness score=10) occurred rapidly. Without the device, however, peak numbness remained for 9.7 minutes, while peak numbness was present for 34.2 minutes with the device in place. Furthermore, both the area under the curve of numbness score over time and the time for the numbness to reach ½ of its prior level (numbness half time) were markedly increased when the device was used.

Although aspects of the present invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A device for treating an affected area of the mucosal tissue in a mouth of a person, the device comprising:
   a fitting portion having an arcuate shape corresponding to a dental arche of the person, the fitting portion has an interior surface facing the person's teeth and has an exterior surface facing the person's check and gums, and the fitting portion further configured to have a front middle section with ends on either side of the front middle section such that the ends of the fitting portion are positioned towards the person's back teeth;
   an upper bite flange and a lower bite flange extending from the interior surface of the fitting portion forming a bite wedge along each end of the fitting portion;
   a covering portion extending upwardly and downwardly from the exterior surface of the fitting portion, the covering portion further extending from the middle section toward each end of the fitting portion, such that the covering portion defines an upper surface edge and a lower surface edge along the middle section of the fitting portion,
   the covering portion further having an upper wing portion positioned at each end of the fitting portion, and each upper wing portion having an upper profile surface configured to include a first upper arcuate surface edge tapering upwardly to an uppermost wing edge that extends to a position higher than the upper surface edge along the middle section of the fitting portion and the upper profile surface further configured to include a second upper arcuate surface edge tapering downwardly from the uppermost wing edge to the end of the fitting portion, and
   the covering portion further having a lower wing portion positioned at each end of the fitting portion, and each lower wing portion having a lower profile surface configured to include a first lower arcuate surface edge tapering downwardly to a lowermost wing edge that extends to a position lower than the lower surface edge along the middle section of the fitting portion, and the lower profile surface further configured to include a second lower arcuate surface edge tapering upwardly from the lowermost wing edge to the end of the fitting portion, and
   each lower wing portion further includes a v-shaped notch being positioned adjacent each bite wedge towards the middle section such that wherein the lower surface edge along the middle section of the fitting portion extends arcuately towards each lower wing portion and the v-shaped notch defines a gap between the lower surface edge and a lower tab extending from the lower bite flange;
   wherein the upper wing portion and the lower wing portions having a defined outer surface shape to cover the mucosal tissue of the person's mouth, and
   wherein the at least one covering section is more flexible than the fitting portion.

2. The device of claim 1, wherein a portion of the outer surface of the covering portion comprises a micro-textured surface having a plurality of reservoirs.

3. The device of any one of claim 2, further comprising:
   a therapeutic agent disposed in the reservoirs.

4. The device of any one of claim 1, further comprising:
   a therapeutic agent disposed on the outer surface of the covering portion.

5. The device of claim 4, wherein the therapeutic agent is an anti-mucositis agent that comprises at least one of:
   a pharmaceutical; a cytoprotective agent; a mucoadhesive substance; a local anesthetic agent; or an antioxidant agent.

6. The device of claim 1, wherein:
   the at least one bite flange further comprises a lower surface, and
   wherein the at least one bite flange is configured such that, when the device is placed in the mouth of the person, the bite flange lower surface contacts lower teeth and the bite flange upper surface contacts upper teeth.

7. The device of claim 6, wherein the at least one bite flange comprises material that is more malleable than that of the fitting portion.

8. The device of claim 1, wherein:
   each of the upper wing portion and the lower wing portion is thinner than the fitting portion,
   wherein the upper wing portion is configured to extend above a gum line of the person to cover or contact a portion of an upper inner cheek, and
   wherein the lower wing portion is configured to extend below a gum line of the person to cover or contact a portion of a lower inner cheek.

9. The device of claim 8, wherein the upper and lower wing portions are configured to cover an opening for a parotid duct and at least one salivary gland.

10. The device of claim 1, wherein the at least one bite flange comprises:
    a guide ridge oriented transversely to the at least one bite flange upper surface.

11. A method of delivering a therapeutic agent to a portion of a mucosal tissue of a person, the method comprising:
    administering a therapeutically effective amount of the therapeutic agent;
    inserting, in a mouth of the person, a device comprising:
    an oral retention portion that is suitably shaped to be retained in an oral cavity for a predetermined treatment period and a covering portion that has at least one surface that contacts the mucosal tissue being treated with the therapeutic agent, and wherein the covering portion is further defined to have extending, from an exterior middle section of the device, ends positioned towards the back of the person's mouth, the exterior middle section of the device defining upper and lower middle section edges, the covering portion being further configured with extending upper wing portions positioned at each end and extending lower wing portions positioned at each end, and wherein both the upper wing portions and the lower wing portions having outer surface shapes that define uppermost wing surface edges and lowermost wing surface edges respectfully, and wherein each of the upper wing portions have an upper profile surface configured to include a first upper arcuate surface edge tapering upwardly from the upper middle section edges to the uppermost wing surface edge and the upper profile surface further configured to include a second upper arcuate surface edge tapering downwardly from the uppermost wing surface edge to the end of the fitting portion, and wherein each of the lower wing portions have a lower profile surface configured to include a first lower arcuate surface edge tapering downwardly from the lower middle section edges to the lowermost wing surface edge and the lower profile surface further configured to include a second lower arcuate surface edge tapering upwardly from the lowermost wing surface edge to the end of the fitting portion, and wherein the uppermost wing surface edge is positioned higher than the upper middle section edge of the device and the lowermost wing surface edge is positioned lower than the lower middle section edges of the device, such that the upper wing portions and lower wing portions covering at least a portion of mucosal tissue in the person's mouth, and wherein an upper bite flange and a lower bite flange extending from the interior surface of the fitting portion forming a bite wedge along each end of the fitting portion, and wherein each lower wing portion further includes a v-shaped notch being positioned adjacent each bite wedge towards the middle section such that wherein the lower surface edge along the middle section of the fitting portion extends arcuately towards each lower wing portion and the v-shaped notch defines a gap between the lower surface edge and a lower tab extending from the lower bite flange.

12. The method of claim 11, wherein administering the therapeutically effective amount of the agent comprises:
administering a therapeutically effective amount of an anti-mucositis agent.

13. The method of claim 12, wherein administering the therapeutically effective amount of the anti-mucositis agent comprises one of:
administering the therapeutically effective amount of the anti-mucositis agent to treat or reduce a severity of mucositis; or
administering the therapeutically effective amount of the anti-mucositis agent to inhibit or delay an onset of mucositis.

14. The method of claim 13, wherein administering the therapeutically effective amount of the anti-mucositis agent is conducted prior to chemotherapy or radiation treatment received by the person wherein the therapeutically effective amount of the anti-mucositis agent inhibits or delays the onset of mucositis.

15. The method of any one of claims 12 and 13, wherein the anti-mucositis agent comprises at least one of:
a pharmaceutical; a cytoprotective agent; a mucoadhesive substance; a local anesthetic agent; or an antioxidant agent.

16. The method of claim 11, wherein the therapeutic agent is an anti-leukoplakia agent.

17. The method of claim 11, wherein administering the therapeutically effective amount of the agent comprises:

a) applying the agent to a portion of the mucosal tissue prior to inserting the device in the mouth of the person;
b) applying the agent to an outer surface of the device prior to inserting the device in the mouth of the person; or
c) prior to inserting the device in the mouth of the person:
applying a first amount of the agent to the portion of the mucosal tissue; and
applying a second amount of the agent to the outer surface of the device.

18. The method of claim 11, wherein administering the therapeutically effective amount of the agent comprises administering the agent as any one of:
a mouthwash; a lozenge; a tablet; a paste; a liquid rinse; a suspension; or a gel.

19. The method of claim 11, wherein the dental device comprises:
a fitting portion having an arcuate shape corresponding to a dental arche of the person and at least one covering portion, the covering portion having a respective outer surface, an upper wing portion and a lower wing portion;
at least one bite flange extending from an interior surface of the fitting portion;
an upper ledge extending from the interior surface of the fitting portion and following the arcuate shape of the fitting portion,
wherein an upper surface of the upper ledge and an upper surface of the at least one bite flange are continuous with one another,
wherein the at least one covering section is more flexible than the fitting portion; and
wherein a portion of the respective outer surface of the at least one covering portion is in contact with the portion of the mucosal tissue.

20. A kit for delivering a therapeutic agent to a mucosal tissue of a person, the kit comprising:
a therapeutically effective amount of the therapeutic agent;
a device, comprising:
a fitting portion having an arcuate shape corresponding to the dental arche of the person, the fitting portion have an interior surface facing the person's teeth and an exterior surface facing the person's check and gums and the fitting portion further configured to have ends on either side of the arcuate shape, such that the ends of the fitting portion are positioned towards the person's back teeth, the exterior surface further defining a middle section positioned between the ends and configured to have a middle upper surface edge and a middle lower surface edge;
an upper bite flange and a lower bite flange extending from the interior surface of the fitting portion forming a bite wedge along each end of the fitting portion;
a covering portion extending from the exterior surface of the fitting portion, the covering portion extending toward each end of the fitting portion, the covering portion further having an upper wing portion positioned at each end of the fitting portion, and each upper wing portion having an upper profile surface configured to include a first upper arcuate surface edge tapering upwardly to an uppermost wing edge that extends to a position higher than the middle upper surface edge of the fitting portion, and the upper profile surface further configured to include a second upper arcuate surface edge tapering downwardly from the uppermost wing edge to the end of the fitting portion, and the covering portion further having a lower wing portion positioned at each end of the fitting portion, and each lower wing portion having a lower profile surface configured to include a first lower arcuate surface edge tapering downwardly to a lowermost wing edge that extends to a position lower than the middle lower surface edge of the fitting portion, and the lower profile surface further configured to include a second lower arcuate surface edge tapering upwardly from the lowermost wing edge to the end of the fitting portion, and wherein the upper wing portion and the lower wing portions having a defined outer surface shape to cover at least a portion of mucosal tissue of the person's mouth, and wherein the at least one covering section is more flexible than the fitting portion, and wherein each lower wing portion further includes a v-shaped notch being positioned adjacent each bite wedge towards the middle section such that wherein the lower surface edge along the middle section of the fitting portion extends arcuately towards each lower wing portion and the v-shaped notch defines a gap between the lower surface edge and a lower tab extending from the lower bite flange; and printed instructions on how to use the device to administer the therapeutic agent to the mucosal tissue of the person.

\* \* \* \* \*